United States Patent
Deguchi

(10) Patent No.: US 8,550,132 B2
(45) Date of Patent: Oct. 8, 2013

(54) PNEUMATIC TIRE AND MANUFACTURING METHOD OF THE SAME

(75) Inventor: Daiki Deguchi, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 23 days.

(21) Appl. No.: 13/324,106

(22) Filed: Dec. 13, 2011

(65) Prior Publication Data

US 2012/0152419 A1    Jun. 21, 2012

(30) Foreign Application Priority Data

Dec. 20, 2010  (JP) .................................. 2010-283467
Nov. 9, 2011   (JP) .................................. 2011-245414

(51) Int. Cl.
- *B60C 11/00*  (2006.01)
- *B60C 19/08*  (2006.01)

(52) U.S. Cl.
USPC .................. 152/152.1; 152/DIG. 2; 156/117; 156/130

(58) Field of Classification Search
USPC .................. 152/152.1, DIG. 2; 156/117, 130
IPC .......................................................... B60C 19/08
See application file for complete search history.

(56) References Cited

U.S. PATENT DOCUMENTS

2008/0006356 A1    1/2008  Takahashi et al.
2009/0173419 A1*   7/2009  Kawakami .................. 152/152.1

FOREIGN PATENT DOCUMENTS

| EP | 819555 A1 | * | 1/1998 |
| JP | 11227415 A | * | 8/1999 |
| JP | 2000-190709 A | | 7/2000 |
| JP | 2008-13000 A | | 1/2008 |
| JP | 2008-024096 A | | 2/2008 |
| JP | 2008024096 A | * | 2/2008 |

OTHER PUBLICATIONS

European Search Report dated Apr. 18, 2012, issued in corresponding European Patent Application No. 11193798.3, (5 pages).

* cited by examiner

*Primary Examiner* — Justin Fischer
*Assistant Examiner* — Kendra Shin
(74) *Attorney, Agent, or Firm* — Westerman, Hattori, Daniels & Adrian, LLP

(57) ABSTRACT

A pneumatic tire has a conductive portion formed by a conductive rubber is provided in the tread rubber formed by a nonconductive rubber. The conductive portion has an outer skin portion and a projection portion. The outer skin portion is formed on a surface of the tread rubber, and extends to an inner side in a tire width direction from a side surface of the tread rubber so as to terminate at a position which goes beyond a contact end. The projection portion spirally extends from a position in an outer side than contact end so as to reach a position in an inner side in the tire width direction than the contact end, and protrudes to an inner side in a tire diametrical direction from the outer skin portion so as to terminate without reaching a bottom surface of the tread rubber.

4 Claims, 4 Drawing Sheets

(A)

(B)

(C)

(A)

(B)

PNEUMATIC TIRE AND MANUFACTURING METHOD OF THE SAME

BACKGROUND OF THE INVENTION

1. Field of the Invention

The present invention relates to a pneumatic tire which can discharge a static electricity generated in a vehicle body and a tire, to a road surface, and a manufacturing method of the pneumatic tire.

2. Description of the Related Art

Recently, there have been proposed a pneumatic tire including a tread rubber blended with silica at a high ratio in order to reduce the rolling resistance that largely affects a fuel consumption performance. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

Accordingly, there has been developed a pneumatic tire structured such that a tread rubber constructed by a nonconductive rubber blended with a silica or the like is provided with a conductive portion constructed by a conductive rubber blended with a carbon black or the like, whereby an electrical conduction performance can be achieved. For example, in a pneumatic tire described in the Japanese Unexamined Patent Publication No. 2000-190709, a surface of a nonconductive tread rubber is provided with a thin conductive portion in which one end is connected to a wing rubber made of a conductive rubber, and another end is terminated at an inner side in a tire width direction than a contact end, thereby forming a conduction route for discharging a static electricity.

However, in the pneumatic tire as mentioned above, when a wear makes progress to such a degree that a surface of the tread rubber disappears by a thickness of the conductive portion, the conductive portion becomes short, a position of a terminal end moves close to a contact end, and a frequency at which the conductive portion comes into contact with a road surface is widely reduced. Therefore, there has been a tendency that an electrical conduction performance after the wear is lowered. On the contrary, there can be considered to employ a strategy of forming the thick conductive portion, however, in the light of enhancing an improving effect by forming the tread rubber by the nonconductive rubber, it is desirable to employ a means which can make a volume of the conductive portion as small as possible.

Further, in a pneumatic tire described in the following Japanese Unexamined Patent Publication No. 2008-13000, a conductive route for discharging a static electricity is formed by embedding a conductive portion which is spirally continuous along a tire circumferential direction in a nonconductive tread rubber, however, in the structure mentioned above, since the conductive route becomes long in distance, there has been a tendency that an electric resistance is increased. In order to well secure the electrical conduction performance, it is desirable to employ a means which can suppress the long distance of the conductive route at least in an early stage of the wear.

SUMMARY OF THE INVENTION

The present invention is made by taking the actual condition mentioned above into consideration, and an object of the present invention is to provide a pneumatic tire which can well secure an electrical conduction performance regardless of a progress degree of a wear and can reduce a volume of a conductive portion provided in a tread rubber, and a manufacturing method of the pneumatic tire.

The object can be achieved by the following present invention. That is, the present invention provides a pneumatic tire comprising a tread rubber formed by a nonconductive rubber, a conductive portion formed by a conductive rubber and reaching a side surface of the tread rubber from a contact surface, and the conductive portion being provided in the tread rubber, wherein the conductive portion comprises an outer skin portion which is formed on a surface of the tread rubber, and extends to an inner side in a tire width direction from the side surface of the tread rubber so as to terminate at a position which goes beyond a contact end, and a projection portion which spirally extends along a tire circumferential direction from a position in an outer side in the tire width direction than contact end so as to reach a position in an inner side in the tire width direction than the contact end, and protrudes to an inner side in a tire diametrical direction from the outer skin portion so as to terminate without reaching a bottom surface of the tread rubber.

In accordance with the pneumatic tire of the present invention, since the outer skin portion is formed on the surface of the tread rubber in the early stage of the wear, it is possible to inhibit the conductive route from becoming longer in comparison with the conductive portion which is continued as the simple spiral shape, and it is possible to well secure the electrical conduction performance. Further, in the middle stage of the wear, even if the outer skin portion disappears due to the progress of the wear, the conductive route reaching the side surface of the tread rubber from the contact surface is formed via the projection portion. Accordingly, it is after all possible to well secure the electrical conduction performance. In addition, since the outer skin portion and the projection portion are terminated as mentioned above, it is possible to effectively reduce the volume of the conductive portion.

In the pneumatic tire in accordance with the present invention, it is preferable that a terminal end position of the outer skin portion is set within a region which is between 5 and 30% of a contact width from the contact end toward the inner side in the tire width direction. Since it is equal to or more than 5%, it is possible to secure a frequency at which the outer skin portion comes into contact with the road surface so as to achieve an excellent electrical conduction performance. Further, since it is equal to or less than 30%, it is possible to effectively reduce the volume of the conductive portion without extending the outer skin portion more than necessary.

In the pneumatic tire in accordance with the present invention, it is preferable that a terminal end position of the projection portion is set within a region which is between 15 and 80% of a main groove depth from the surface of the tread rubber. Since it is equal to or more than 15%, it is possible to prevent the projection portion from disappearing early due to the progress of the wear so as to well maintain the electrical conduction performance after the wear. Further, since it is equal to or less than 80%, it is possible to effectively reduce the volume of the conductive portion without extending the projection portion more than necessary.

In the pneumatic tire in accordance with the present invention, it is preferable that the thickness of the projection portion is made larger than the thickness of the outer skin portion. Thereby, it is possible to prevent a decoupling of the projection portion so as to secure an electrical conduction performance after the wear, and to prevent cracks of the projection portion so as to secure a durability performance.

Further, the present invention provides a manufacturing method of a pneumatic tire, the pneumatic tire comprising a tread rubber formed by a nonconductive rubber, a conductive portion formed by a conductive rubber and reaching a side surface of the tread rubber from a contact surface, and the conductive portion being provided in the tread rubber, wherein a step of forming the tread rubber includes a stage of spirally winding in an overlapping manner a rubber ribbon formed by coating at least a part of an outer peripheral surface of a band-like nonconductive rubber portion by a conductive rubber portion, along a tire circumferential direction, and connecting one end portion of the conductive rubber portion to a body portion of the conductive rubber portion which are adjacent to each other, and wherein a portion which the conductive rubber portion exposes to a surface of the tread rubber is set to an outer skin portion which extends to an inner side in a tire width direction from a side surface of the tread rubber so as to terminate at a position going beyond a contact end, and the remaining portion of the conductive rubber portion is set to a projection portion which extends spirally along the tire circumferential direction from a position in an outer side in the tire width direction than the contact end so as to reach a position in an inner side in the tire width direction than the contact end, and protrudes to the inner side in the tire diametrical direction from the outer skin portion so as to terminate without reaching a bottom surface of the tread rubber.

In accordance with the manufacturing method of the pneumatic tire of the present invention, it is possible to easily and effectively form the conductive portion of the pneumatic tire in accordance with the present invention mentioned above, by spirally winding the rubber ribbon as mentioned above. The manufactured pneumatic tire can inhibit the conductive route from becoming longer by the outer skin portion so as to well secure the electrical conduction performance in the early stage of the wear, and can well secure the electrical conduction performance by the projection portion in the stage that the outer skin portion disappears by the progress of the wear. In addition, since the outer skin portion and the projection portion are terminated as mentioned above, it is possible to effectively reduce the volume of the conductive portion.

In the manufacturing method of the pneumatic tire in accordance with the present invention, it is preferable that the outer skin portion is terminated within a region which is between 5 and 30% of a contact width from the contact end toward the inner side in the tire width direction. Since it is equal to or more than 5%, it is possible to secure a frequency at which the outer skin portion comes into contact with the road surface so as to achieve an excellent electrical conduction performance. Further, since it is equal to or less than 30%, it is possible to effectively reduce the volume of the conductive portion without extending the outer skin portion more than necessary.

In the manufacturing method of the pneumatic tire in accordance with the present invention, it is preferable that the projection portion is terminated within a region which is between 15 and 80% of a main groove depth from the surface of the tread rubber. Since it is equal to or more than 15%, it is possible to prevent the projection portion from disappearing early due to the progress of the wear so as to well maintain the electrical conduction performance after the wear. Further, since it is equal to or less than 80%, it is possible to effectively reduce the volume of the conductive portion without extending the projection portion more than necessary.

In the manufacturing method of the pneumatic tire in accordance with the present invention, it is preferable that the thickness of the portion of the conductive rubber portion which is the projection portion is made larger than the thickness of the portion of the conductive rubber portion which is the outer skin portion. Thereby, it is possible to prevent a decoupling of the projection portion so as to secure an electrical conduction performance after the wear, and to prevent cracks of the projection portion so as to secure a durability performance.

DETAILED DESCRIPTION OF PREFERRED EMBODIMENTS

Figure 1:
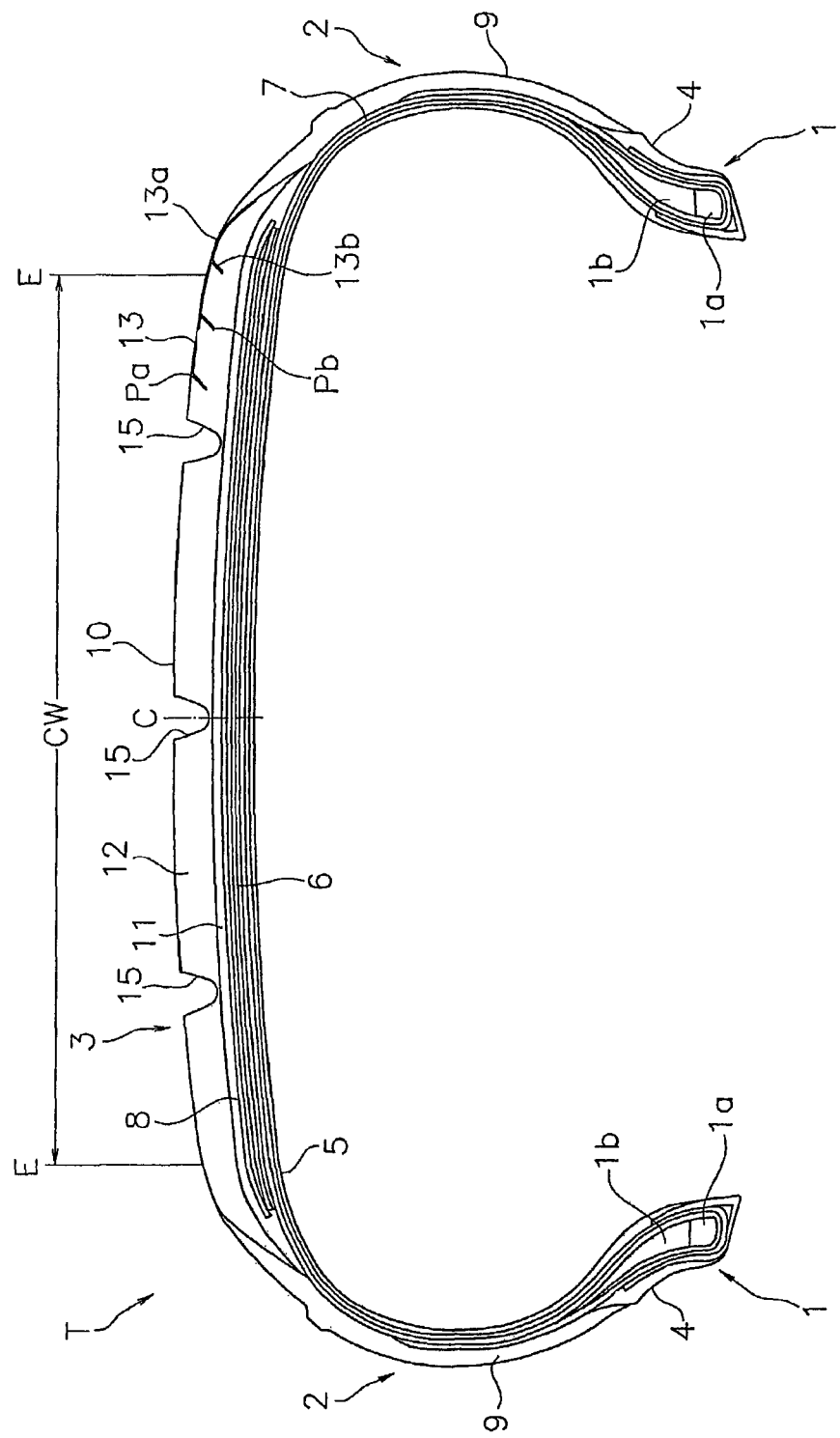
FIG. 1 is a cross sectional view of a tire meridian showing one example of a pneumatic tire according to the present invention.

An embodiment of the present invention will be explained with reference to the drawings. A pneumatic tire T shown in FIG. 1 includes a pair of bead portions 1, side wall portions 2 extending from the bead portions 1 to outer side in a tire diametrical direction, a tread portion 3 connected to outer ends in a tire diametrical direction of the side wall portions 2. The bead portion 1 includes an annular bead 1a composed of a bundle of steel wires or the like sheathed with rubber and a bead filler 1b of hard rubber disposed therein.

A toroid-shaped carcass layer 7 is arranged between the pair of bead portions 1, and an end portion thereof is fixed via the bead 1a being wound thereon. The carcass layer 7 is constructed by at least one (two in the present embodiment) carcass plies, and the carcass ply is formed by covering a cord extending at an angle of approximately 90□ with respect to the tire equator C with a topping rubber. The carcass layer 7 is provided with an inner liner rubber 5 for maintaining air pressure on the inner periphery thereof.

The bead portion 1 of the carcass layer 7 is provided with a rim strip rubber 4 on the outer periphery thereof, which abuts on a rim (not shown). Also, the sidewall portion 2 of the carcass layer 7 is provided with a side wall rubber 9 on the outer periphery thereof. According to the embodiment, the rim strip rubber 4 and the side wall rubber 9 are formed of conductive rubber respectively.

A belt layer 6 constructed by a plurality of (two in the present embodiment) belt plies is arranged on an outer periphery of the carcass layer 7 in the tread portion 3. Each of the belt plies is formed by covering a cord extending while inclining with respect to the tire equator C with a topping rubber, and is laminated in such a manner that the cord intersects inversely to each other between the plies. A belt reinforcing layer 8 constructed by covering a cord extending substantially in a tire circumferential direction with a topping rubber is arranged in an outer periphery of the belt layer 6, however, it may be omitted as occasion demands.

A tread rubber 10 formed by a nonconductive rubber is arranged in the tread portion 3, and the tread rubber 10 is provided with a conductive portion 13 which is formed by a conductive rubber and reaches a side surface of the tread rubber 10 from a contact surface. The tread rubber 10 in accordance with the present embodiment is provided with a cap portion 12 which is formed by a nonconductive rubber and constructs the contact surface, and a base portion 11 which is formed by a nonconductive rubber and is joined to an inner side in a tire diametrical direction of the cap portion 12. A plurality of main grooves 15 extending along a tire circumferential direction are formed on a surface of the tread rubber 10.

The conductive rubber points to a rubber in which a specific volume resistance is less than $10^8 \Omega \cdot cm$, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8 \Omega \cdot cm$, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

It is preferable that the conductive rubber forming the conductive portion 13 has a composition which satisfies such a relationship that a nitrogen adsorption specific surface area $N_2SA$ ($m^2/g$)×compounding amount (mass %) of the carbon black is equal to or more than 1900, preferably equal to or more than 2000, and a dibutyl phthalate oil absorption DBP (ml/100 g)×compounding amount (mass %) of the carbon black is equal to or more than 1500, preferably equal to or more than 1700, in the light of enhancing the durability of the conductive portion 13 so as to improve the electrical conduction performance. $N_2SA$ is determined in conformity with ASTM D3037-89, and DBP is determined in conformity with ASTM D2414-90.

Figure 2:
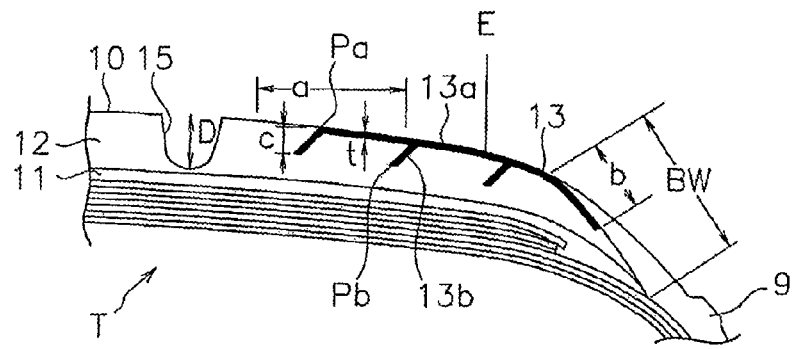
FIG. 2 is an enlarged view showing a substantial part of the tire in FIG. 1.

As shown in an enlarged manner in FIG. 2, the conductive portion 13 has an outer skin portion 13a and a projection portion 13b. The outer skin portion 13a is formed on a surface of the tread rubber 10, and extends to an inner side in a tire width direction from a side surface of the tread rubber 10 so as to be terminated at a position which goes beyond a contact end E. The outer skin portion 13a is connected to the side wall rubber 9 which is joined to a side surface of the tread rubber 10, and constructs a conductive route in the early stage of a wear. In other words, a static electricity generated in a vehicle body and a tire is discharged to a road surface from the rim via the rim strip rubber 4, the side wall rubber 9, and the outer skin portion 13a of the conductive portion 13.

The projection portion 13b extends spirally along a tire circumferential direction from a position in an outer side in a tire width direction than the contact end E so as to reach a position in an inner side in the tire width direction than the contact end E, and protrudes to an inner side in a tire diametrical direction from the outer skin portion 13a so as to be terminated without reaching the bottom surface of the tread rubber 10. In the present embodiment, the projection portion 13b extending continuously as the spiral shape appears as three beard-like projections in a cross section of a tire meridian circle which is vertical to the tire circumferential direction. At least one beard-like projection mentioned above appears in the outer side in the tire width direction of the contact end E and in the inner side thereof in the tire width direction respectively.

If the wear makes progress to a certain degree from a state shown in FIGS. 1 and 2 in which the tire is new, major part of the outer skin portion 13a disappears, and a terminal end position Pa moves close to the contact end E. In the stage mentioned above, a frequency at which the outer skin portion 13a comes into contact with the road surface is widely reduce, in the case that the load applied to the tire is small, however, in the tire T, it is possible to well secure the electrical conduction performance through the conductive route via the projection portion 13b. In other words, in the state in which the outer skin portion 13a disappears by the progress of the wear, a conductive route which reaches the side surface of the tread rubber 10 from the contact surface is formed via the projection portion 13b which appears on the surface of the tread rubber 10.

Since the conductive route by the projection portion 13b is formed as the spiral shape, however, the leading end of the sidewall rubber 9 tends to be grounded in this stage, in comparison with the early stage of the wear, a problem that the conductive route becomes long can be lightened. Since the side wall rubber 9 comes to the easily grounded by the further progress of the wear, in an end stage of the wear, the electrical conduction performance can be secured. The side wall rubber 9 comes to a state in which a leading end thereof can be grounded on the road surface, at a time of 15% wear (a state in which 15% of the main groove depth D wears).

As mentioned above, since the outer skin portion 13a extends in the tire width direction from the side wall rubber 9 so as to reach within the contact surface in the early stage of the wear, the conductive route is inhibited from becoming longer, in comparison with the conductive portion which is continued as the simple spiral shape, and the electrical conduction performance can be well secured. Further, in the middle stage of the wear, even if the outer skin portion 13a disappears, it is possible to well secure the electrical conduction performance through the conductive route via the projection portion 13b. Therefore, in this tire T, the electrical conduction performance can be well secured regardless of the progressing degree of the wear.

Since the tread rubber 10 is all formed by the nonconductive rubber except the conductive portion 13, the other conductive rubber is not connected to the terminal end position Pa of the outer skin portion 13a and the terminal end position Pb of the projection portion 13b, and the outer skin portion 13a and the projection portion 13b are terminated as mentioned above, it is possible to effectively reduce the volume of the conductive portion 13. As a result, it is possible to well enhance an improving effect by forming the tread rubber 10 by the nonconductive rubber (in the case of being highly blended with the silica, a reducing effect of a rolling resistance and an improving effect of a braking performance on a wet road surface).

In the present embodiment, there is shown the example in which the conductive portion 13 is provided only in one side in the tire width direction, however, this may be provided in both sides in the tire width direction. However, in the light of reducing the volume of the conductive portion 13, it is preferable that the conductive portion 13 is provided only in one side in the tire width direction as the present embodiment.

The terminal end position Pa of the outer skin portion 13a is positioned in the inner side in the tire width direction than the contact end E, that is, is arranged within the contact surface. This contact surface indicates a surface of the tread portion which is grounded on the road surface at a time of assembling in a normal rim, vertically putting the tire on the flat road surface in a state in which a normal internal pressure is charged, and applying a normal load, and an outermost position in the tire axial direction comes to the contact end E. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. Further, the normal load is a load determined per tire by a standard system including a standard on which the tire is based, and is a maximum load capacity in JATMA, a maximum value described in Table mentioned above in TRA, or "LOAD CAPACITY" in ETRTO, however, in the case that the tire is for a passenger car, it is set to 85% of a corresponding load to 180 kPa.

It is preferable that the terminal end position Pa of the outer skin portion 13a is located in the outer side in the tire width direction than the main groove 15 which is positioned in the outermost side in the tire width direction, in the light of reducing the volume of the conductive portion 13. Further, it is preferable that the terminal end position Pa is set within a region a, and this region a is a region which comes to 5 to 30% of the contact width CW from the contact end E toward the inner side in the tire width direction. The contact width CW is defined as a distance in the tire width direction between the contact ends E and E.

In the present embodiment, the conductive portion 13 is interposed in the interface between the tread rubber 10 and the side wall rubber 9, and the conductive portion 13 is securely connected to the side wall rubber 9. It is preferable that a width b of a region in which the conductive portion 13 and the side wall rubber 9 overlap is between 50 and 100% with respect to a width BW of the interface between the tread rubber 10 and the side wall rubber 9, and it is preferably between 50 and 80% in the light of reducing the volume of the conductive portion 13. If the conductive portion 13 is connected to the side wall rubber 9, the width b may be made approximately zero.

The conductive portion 13 is provided in such a manner as to be connected to the rim or the rubber which can be conductive from the rim, and constructs a conductive path for discharging a static electricity to the road surface. In this tire T, it is possible to form any or all of the topping rubber of the carcass ply, the rim strip rubber 4 and the side wall rubber 9 by a nonconductive rubber, and in this case, the conductive portion 13 may be extended to the side wall rubber 9, the rim strip rubber 4 or an outer wall surface of the rim strip rubber 4 coming into contact with the rim. Further, it is possible to form the topping rubber of the belt layer 6 or the belt reinforcing layer 8 by the nonconductive rubber.

It is preferable that the terminal end position Pb of the projection portion 13b is set within a range between 15 and 80% of the main groove width D from the surface of the tread rubber 10. In other words, it is preferable that a depth c from the surface of the tread rubber 10 to the terminal end position Pb is between 15 and 80% of the main groove depth D. Further, the number of the projection portion 13b (the number of the beard-like projection) appearing in the cross section of the tire meridian circle is exemplified by 2 to 10. A relative position of the projection portion 13b with respect to the contact end E is defined on the basis of a root of the projection portion 13b (a connected position to the outer skin portion 13a).

The outer skin portion 13a is formed thin, and a thickness t thereof is preferably equal to or less than 1 mm, for reducing the volume of the conductive portion 13, and is more preferably equal to or less than 0.5 mm. Further, in order to prevent a disconnection of the conductive route so as to maintain the electrical conduction performance, the thickness t is preferably equal to or more than 0.03 mm, and more preferably equal to or more than 0.05 mm. This is applied in the same manner to a thickness of the projection portion 13b.

In the present embodiment, there is shown the example which employs a side-on tread structure obtained by mounting the end portion of the side wall rubber 9 on both end portions of the tread rubber 10, however, the invention is not limited to this, but there can be employed a tread-on side structure obtained by mounting the end portion of the tread rubber 10 on the end portion of the side wall rubber 9. In this case, a wing rubber formed by the conductive rubber is joined to the side surface of the tread rubber and the outer skin portion is connected to the wing rubber.

Figure 7:
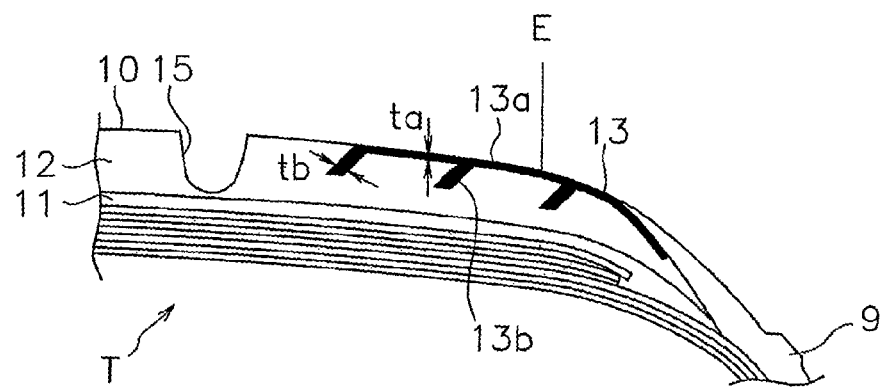
FIG. 7 is a cross sectional view showing a substantial part of the tread rubber in another embodiment in the present invention.

As a preferable embodiment in this tire T, as shown in FIG. 7, there can be listed up a structure in which thickness tb of the projection portion 13b is made larger than the thickness ta of the outer skin portion 13a. Thereby, it is possible to prevent a decoupling of the projection portion 13b so as to secure the electrical conduction performance after the wear, and to prevent cracks of the projection portion 13b so as to secure a durability performance. Such decoupling or cracks of the projection portion 13b are caused by processing of forming the tread pattern at the time of cure molding.

That is, in case that a lateral groove extending in the crossing direction with respect to a tire circumferential direction is formed on the conductive portion 13, a mold pressed on the surface of the tread rubber 10 is provided with a convex portion for forming the lateral groove, and this convex portion results in compressing the projection portion 13b. Thereby, if the portion 13b comes to be decoupled, it becomes difficult to secure an electrical conduction performance after the wear, and in addition, if the projection portion 13b is formed thin below the lateral groove, cracks occur due to ozone and the like and the durability performance becomes degraded.

In order to avoid problems like the mentioned above, it is effective to set thickness tb larger than thickness ta, and in that case, it is preferable that thickness ta of the outer skin portion 13a is 0.03 mm or more, and it is more preferable that thickness ta is 0.05 mm or more. In addition, it is preferable to set thickness tb of the projection portion 13b to be from 1.5 to 3.0 times as thickness ta.

Next, a description will be given a method of manufacturing the pneumatic tire T. Since this tire T can be manufactured in the same manner as the conventional tire manufacturing step except the point relating to the tread rubber 10, a description will be given by focusing on a forming step of the tread rubber. As mentioned below, the tread rubber 10 is formed by a so-called ribbon winding construction method. The ribbon winding construction method is a construction method of spirally winding a rubber ribbon which has a small width and is not cured yet in a tire circumferential direction, and forming a rubber member having a desired cross sectional shape.

Figure 3:
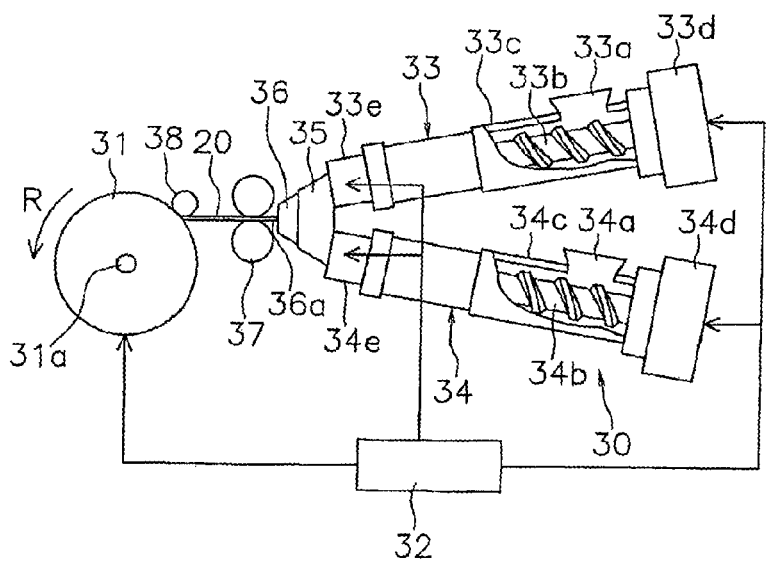
FIG. 3 is a view of an outline structure of an equipment for carrying out a winding of a rubber ribbon.

The forming and the winding of the rubber ribbon can be carried out by using an equipment as exemplified in FIG. 3. This equipment is provided with a rubber ribbon supply apparatus 30 which can form a double-layered rubber ribbon 20 by co-extruding two kinds of rubbers, a rotational support body 31 around which the rubber ribbon 20 supplied from the rubber ribbon supply apparatus 30 is wound, and a control apparatus 32 which carries out an actuation control of the rubber ribbon supply apparatus 30 and the rotational support body 31. The rotational support body 31 is structured such that it can rotate in a direction R around an axis 31a and move in an axial direction.

An extruding machine 33 is provided with a hopper 33a, a screw 33b, a barrel 33c, a drive apparatus 33d of the screw 33b, and a head portion 33e having a gear pump built-in. In the same manner, an extruding machine 34 is provided with a hopper 34a, a screw 34b, a barrel 34c, a drive apparatus 34d and a head portion 34e. A rubber combining portion 35 additionally provided with a die 36 is provided in leading ends of a pair of extruding machines 33 and 34.

If the nonconductive rubber corresponding to the rubber material is introduced in the hopper 33a, and the conductive rubber corresponding to the rubber material is introduced in the hopper 34a, the respective rubbers are fed out forward while being mixed by the screws 33b and 34b, passed by the head portion 33e and 34e, combined in a predetermined shape at the rubber combining portion 35, and extruded as the double-layered rubber ribbon 20 from a discharge port 36a. The formed rubber ribbon 20 is fed out forward by a roll 37, and is wound around the rotational support body 31 while being pressed by a roller 38.

Figure 4:
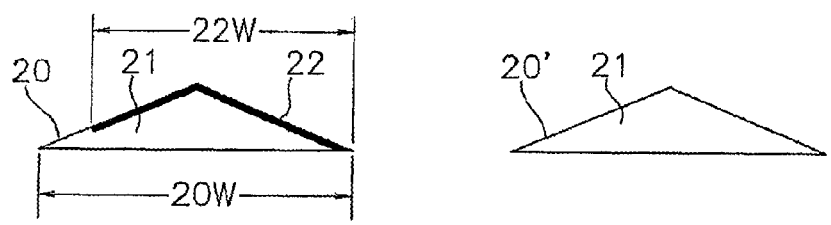
FIGS. 4(A) and 4(B) are cross sectional views showing one example of the rubber ribbon which is used for forming a tread rubber.

FIG. 4(A) is a cross sectional view showing the double-layered rubber ribbon 20, and a lower side in FIG. 4 comes to an inner peripheral side which faces to the rotational support body 31 at a time of being wound. The rubber ribbon 20 is constructed by a band-like nonconductive rubber portion 21, and a conductive rubber portion 22 which covers at least a part of an outer peripheral surface of the nonconductive rubber portion 21. A width 22W of the conductive rubber portion 22 is set, for example, to 75 to 100% of a total width 20W of the rubber ribbon 20. A cross section of the rubber ribbon 20 is not limited to a triangular shape, but may be set to the other shapes such as a rectangular shape, an oval shape and the like.

If the extrusion of the conductive rubber is stopped by stopping the rotation of the gear pump within the head portion 34e, and stopping the screw 34b if necessary, at a time of extruding the rubber ribbon 20, a single-layered rubber ribbon 20' formed only by the nonconductive rubber portion 21 as shown in FIG. 4(B) can be obtained. The actuation of the gear pumps within the head portions 33e and 34e and the screws 33b and 34b as mentioned above is controlled by the control apparatus 32, and it is possible to freely carry out a switching between the single layer and the double layer of the rubber ribbon.

In the step of forming the tread rubber 10, the rubber ribbon made of the nonconductive rubber is spirally wound around an outer peripheral surface of the rotational support body 31 along the tire circumferential direction, thereby forming the base portion 11 as shown in FIG. 5(A). Next, the single-layer rubber ribbon 20' as shown in FIG. 4(B) is spirally wound in an overlapping manner along the tire circumferential direction, thereby forming a position in which the conductive portion 13 of the cap portion 12 is not provided as shown in FIG. 5(B).

Subsequently, the double-layered rubber ribbon 20 as shown in FIG. 4(A) is spirally wound in an overlapping manner along the tire circumferential direction, thereby forming a position in which the conductive portion 13 of the cap portion 12 is provided, as shown in FIG. 5(C). At this time, as shown in FIG. 6, one end portion of the conductive rubber portion 22 is connected to a body portion of the adjacent conductive rubber portion 22. As mentioned above, a portion which the conductive rubber portion 22 exposes to the surface of the tread rubber 10 is formed as the outer skin portion 13a, and the remaining portion of the conductive rubber portion 22 is formed as the projection portion 13b.

In the structure mentioned above, it is possible to continuously change from a stage in FIG. 5(B) to a stage in FIG. 5(C) by appropriately switching the rubber ribbon 20' and the rubber ribbon 20. Further, the order of them may be reversed. With regard to a formation of the base portion 11 and a position in which the conductive portion 13 of the cap portion 12 are not provided, an extrusion forming method may be employed. The extrusion forming method is a construction method of extrusion forming an uncured rubber member having a predetermined cross sectional shape and jointing end portions thereof to each other so as to form in an annular shape.

At a time of winding the double-layered rubber ribbon 20, it is preferable to terminate the outer skin portion 13a within a region which comes to 5 to 30% of the contact width CW from the contact end E toward the inner side in the tire width direction. Further, it is preferable to terminate the projection portion 13b within a range between 15 and 80% of the main groove depth D from the surface of the tread rubber 10.

Figure 5:
FIGS. 5(A) to 5(C) are cross sectional views schematically showing a forming step of the tread rubber.
Figure 5:
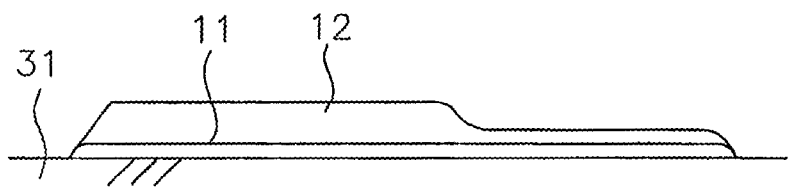
Figure 5:
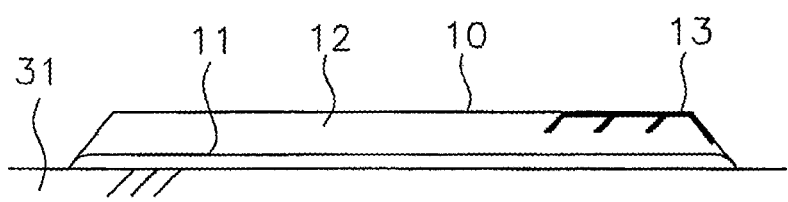
Figure 6:
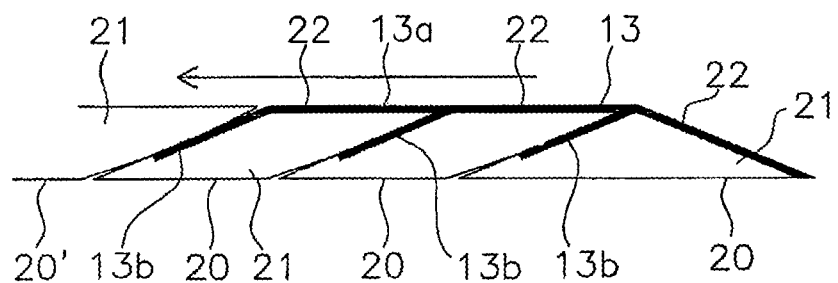
FIG. 6 is a cross sectional view schematically showing the winding of the rubber ribbon.

A description is omitted in FIG. 5, however, the belt layer 6 and the belt reinforcing layer 8 are arranged in the inner periphery of the tread rubber 10. A green tire is formed by combining the tread rubber 10 with the other tire constructing members such as the carcass layer 7, the side wall rubber 9 and the like, and the pneumatic tire T shown in FIG. 1 can be manufactured by applying a curing treatment to the green tire.

Figure 8:
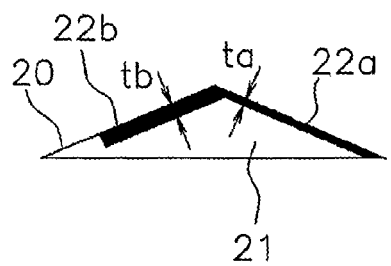
FIGS. 8(A) and 8(B) are cross sectional views showing one example of a rubber ribbon which is used for forming the tread rubber of FIG. 7.
Figure 8:
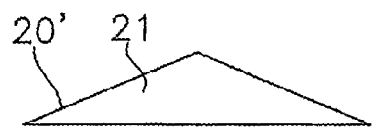
Figure 9:
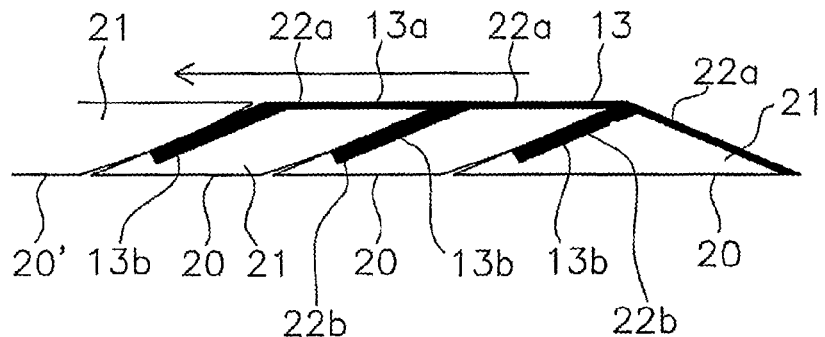
FIG. 9 is a cross sectional view schematically showing the winding of the rubber ribbon of FIG. 8.

In case of thickening the projection portion 13b as shown FIG. 7, the rubber ribbon 20 shown in FIG. 8 is used. In this rubber ribbon 20, thickness tb of the portion 22b of the conductive rubber portion, which is the projection portion 13b, is made larger than thickness to of the portion 22a of the conductive rubber portion, which is the outer skin portion 13a. By winding this in the same manner of FIG. 5 and FIG. 6, the conductive portion 13 is provided with the outer skin portion 13a having thickness to and the projection portion 13b having thickness tb as shown in FIG. 9.

At the time of taking a curing step of the green tire, a mold is pressed on the surface of the tread rubber 10, and a convex portion for forming a lateral groove results in compressing the projection portion 13b, however, by thickening the projection portion 13b like this, it is possible to prevent a decoupling of the projection portion 13b to secure an electrical conduction performance after the wear, and to prevent cracks of the projection portion 13b to secure a durability performance.

What is claimed is:

1. A manufacturing method of a pneumatic tire, the pneumatic tire comprising:
   a tread rubber formed by a nonconductive rubber;
   a conductive portion formed by a conductive rubber and reaching a side surface of the tread rubber from a contact surface; and
   the conductive portion being provided in the tread rubber, wherein a step of forming the tread rubber includes a stage of spirally winding in an overlapping manner a rubber ribbon formed by coating at least a part of an outer peripheral surface of a band-like nonconductive rubber portion by a conductive rubber portion, along a tire circumferential direction, and connecting one end portion of the conductive rubber portion to a body portion of the conductive rubber portion which are adjacent to each other, and wherein a portion which the conductive rubber portion exposes to a surface of the tread rubber is set to an outer skin portion which extends to an inner side in a tire width direction from a side surface of the tread rubber so as to terminate at a position going beyond a contact end, and the remaining portion of the conductive rubber portion is set to a projection portion which extends spirally along the tire circumferential direction from a position in an outer side in the tire width direction than the contact end so as to reach a position in an inner side in the tire width direction than the contact end, and protrudes to the inner side in the tire diametrical direction from the outer skin portion so as to terminate without reaching a bottom surface of the tread rubber.

2. The manufacturing method of a pneumatic tire according to claim 1, wherein the outer skin portion is terminated within a region which is between 5 and 30% of a contact width from the contact end toward the inner side in the tire width direction.

3. The manufacturing method of a pneumatic tire according to claim 1, wherein the projection portion is terminated within a region which is between 15 and 80% of a main groove depth from the surface of the tread rubber.

4. The manufacturing method of a pneumatic tire according to claim 1, wherein the thickness of the portion of the conductive rubber portion which is the projection portion is made larger than the thickness of the portion of the conductive rubber portion which is the outer skin portion.

* * * * *